United States Patent
Tennies

(10) Patent No.: US 6,524,191 B1
(45) Date of Patent: Feb. 25, 2003

(54) INVERTED COUPLING ASSEMBLY

(76) Inventor: James O. Tennies, 81 N Erie St., Mayville, NY (US) 14757

( * ) Notice: Subject to any disclaimer, the term of this patent is extended or adjusted under 35 U.S.C. 154(b) by 0 days.

(21) Appl. No.: 09/961,597

(22) Filed: Sep. 21, 2001

(51) Int. Cl.[7] .............................................. F16D 3/18
(52) U.S. Cl. ...................................... 464/154; 464/156
(58) Field of Search ........................... 464/154, 16, 153, 464/155, 156, 158, 162

(56) References Cited

U.S. PATENT DOCUMENTS

| | | | |
|---|---|---|---|
| 2,455,870 A | * 12/1948 | Maul et al. | 464/154 |
| 2,680,634 A | 6/1954 | Haworth et al. | 287/58 |
| 2,706,125 A | 4/1955 | Morley | 287/62 |
| 3,010,294 A | 11/1961 | Spier | 64/9 |
| 3,132,494 A | 5/1964 | Hoffer | 64/9 |
| 3,243,973 A | 4/1966 | Kraeling | 64/9 |
| 3,521,462 A | 7/1970 | Heidrich | 64/9 |
| 3,613,395 A | 10/1971 | Shigeura | 64/9 |
| 4,198,832 A | 4/1980 | Pauli | 64/9 |
| 4,443,205 A | 4/1984 | Grant | 464/16 |
| 4,789,376 A | 12/1988 | Grant | 464/154 |
| 5,393,267 A | 2/1995 | Munyon | 464/156 |
| 6,283,869 B1 | * 9/2001 | Spensberger | 464/153 |

* cited by examiner

Primary Examiner—Lynne H. Browne
Assistant Examiner—Kenn Thompson
(74) Attorney, Agent, or Firm—Wayne L. Lovercheck

(57) ABSTRACT

An inverted coupling for transmitting power between the shafts of an electric motor and a gear box pinion includes sleeve ring gears mounted on the respective shafts for rotation therewith and each sleeve ring gear having internal gear teeth that intermesh with the outer coupling teeth of coupling members that partially underlap the sleeve ring gears and are axially aligned therewith. A center flange is circumjacently mounted on the coupling members for transmitting torque between the sleeve ring gear coupling member pair drivingly mounted on the motor shaft and the sleeve ring gear coupling member pair drivingly mounted on the gear pinion shaft. The sleeve ring gears axially move concurrent with the axial motion of the motor and gear pinion shafts and stay in intermeshing engagement with the respective coupling members for maintaining torque transmission between the electric motor and the gear pinion box.

19 Claims, 3 Drawing Sheets

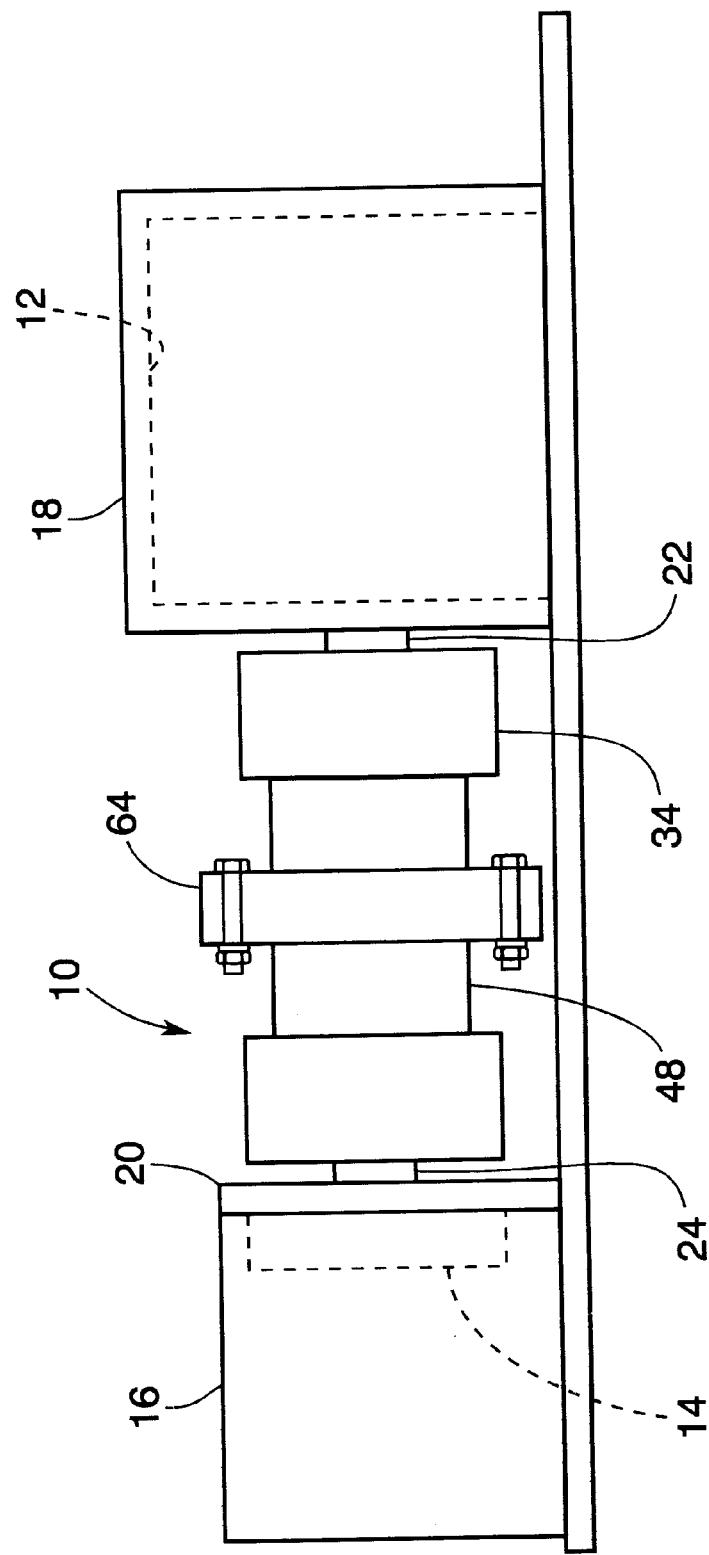

INVERTED COUPLING ASSEMBLY

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention pertains to coupling assemblies for transmitting torque between machine elements having driving and driven components, and, more particularly, pertains to an inverted coupling assembly for providing power transmission between a power source, such as an electric motor, and driven elements, such as the gear pinion shaft for a gear box.

Couplings of numerous types and configurations are used for the transmission of torque between prime movers that can include gas turbines and electric motors and driven machinery and equipment such as pumps and gear reduction units. Since the driving and driven shafts may operate in harsh environments, under severe tensions and loads, and in low, intermediate, and high-speed applications, coupling assemblies for many specific applications have been devised.

For example, when the driven machine includes a thrust bearing, a slide-type coupling is usually employed that allows for axial movement of the driven shaft. Certain types of gas turbine machinery also use slide-type couplings for the shaft of the driven machine. In situations where thrust bearings are not used, a coupling that allows limited end float is instead used; and this type of coupling restricts the axial motion of the driven shaft.

Another type of widely used coupling includes a pair of gear hubs that are mounted on the driving and driven shafts and a pair of sleeves that mesh with the hubs. The sleeves mesh with the hubs through annular flanges that are bolted onto the sleeves. Because of the generally large external diameter of each hub and sleeve arrangement, this type of gear coupling requires applications where lateral space and centrifugal force are not critical limiting factors.

In a variation of the above-described coupling, a single cylindrical sleeve can be mounted in intermeshing arrangement on the hubs that are secured to the driving and driven shafts. However, this type of coupling has installation difficulties and also requires frequent servicing due to the reduced area of the lubricant channel.

For high-speed applications, a type of coupling is used that includes a flange mounted to the driving and driven shafts and a spacer disposed therebetween in driving engagement with the flanges by splines. This type of coupling does not allow for significant parallel offset and angular misalignment because the splines are not precision contoured.

A factor to consider in all coupling assemblies is the problems that result when drive elements are exposed to harsh and hazardous environmental conditions. In many applications the power source, such as the gas turbine or electric motor, is enclosed within a housing and fixedly mounted on bed or frame. The driven element, such as the pump or gearbox, is enclosed within an adjacent but separate housing, and on the same bed or frame in order to establish the operational spacing and relationships of the machinery. Nonetheless, portions of both the driving and driven shafts protrude unprotected from the respective housings; and the gear elements connecting the shafts are also fixed in position by the predetermined spacing. A hood or shroud can be used to enclose the driving and driven shafts, and the gear and coupling elements, but this causes numerous problems in the initial assembly and subsequent repair of all the aforedescribed machine elements.

For the specific application of power transmission between the electric motor and the gearbox pinion of electric motor driven mass transmit cars, gear couplings capable of high misalignment are typically used. Such gear couplings have crowned male gear teeth to allow the intermeshing engagement of the gear couplings to the motor shaft and gear pinion shaft. The sleeve gears of this type of coupling are provided with internal teeth that are normally flanged ring gears that are normally bolted together and the mounted on the hub gears. While this type of coupling arrangement allows the sleeve ring to float toward either the motor or gearbox, there is the possibility that the sleeve rings could contact the shroud or enclosure of the motor or gear box pinion thus damaging the machinery and necessitating costly repairs and downtime.

In view of the above problems and considerations, the prior art discloses a variety of coupling assemblies having wide-ranging industrial applications.

For example, Haworth et al. (U.S. Pat. No. 2,680,634) discloses an annular member, which provides a ball-and-socket connection between a stub shaft and a turbine shaft.

Morley (U.S. Pat. No. 2,706,125) discloses a shaft coupling that also provides an annular member for making a ball-and-socket connection among a compressor shaft, a stub shaft, and a turbine shaft so that thrust can be transmitted through the shafts.

Spier (U.S. Pat. No. 3,010,294) discloses a gear-type misalignment coupling that includes a misalignment coupling disposed between an input shaft and an output shaft, and at each end of the coupling a hub and sleeve arrangement is mounted for intermeshing engagement therewith in order to transmit power during various shaft misalignment configurations.

Hoffer (U.S. Pat. No. 3,132,494) discloses a flexible coupling for coupling a pair of rotatable shafts and accommodating a wider range of shaft misalignments and includes complementary pairs of hub and sleeve elements mountable to the ends of the respective shafts.

Kraeling (U.S. Pat. No. 3,243,973) discloses a flexible gear coupling for transmitting power between aligned and misaligned shafts and includes a hub and sleeve arrangement for mounting to the ends of the shafts so that each pair of hub and sleeve are in intermeshing engagement and each sleeve is capable of flexing within certain predetermined limits to facilitate load transmission between the shafts.

Heidrich (U.S. Pat. No. 3,521,462) discloses a gear coupling that includes a pair of externally toothed hubs fitted onto the ends of confronting shafts and which mesh with teeth of a sleeve interposed between the hubs. The sleeve includes longitudinal slots to provide for some limited torsional elasticity.

Shigeura (U.S. Pat. No. 3,613,395) discloses a shaft coupling device that includes a pair of internal and external gears mounted on the ends of opposing shafts and which are enclosed by a cylindrical housing. A resilient disc is disposed between the gear pairs for moderating vibrations and shocks that occur during operation of the machinery.

Pauli (U.S. Pat. No. 4,198,832) discloses a flexible drive coupling that includes a shroud for enclosing the driving and driven gear hubs. A flexible spacer member is disposed between the gear hubs to maintain proper spacing and alignment of the gear hubs.

Grant (U.S. Pat. No. 4,443,205) discloses a gear type shaft coupling that includes a pair of hubs and sleeves attached to the opposed ends of confronting shafts. Adjacent the inner end of each hub is a plate for stabilizing the shafts during operation.

Grant (U.S. Pat. No. 4,789,376) discloses a gear type shaft coupling that includes a hub and sleeve pair mounted on each end of confronting shafts and a ring that overlaps both hub and sleeve pairs and is fixed thereto for transmitting torque between the shafts.

Munyon (U.S. Pat. No. 5,393,267) discloses a coupling for driving and driven shafts that includes a pair of sleeves in the form of tubular members that can limit the end float of the coupling.

BRIEF SUMMARY OF THE INVENTION

The present invention comprehends coupling assemblies for transmitting torque between the driving and driven shafts of an electric motor and gear box reduction unit, and, more particularly comprehends an inverted coupling for transmitting power between an electric motor and gear box pinion for a mass transit vehicle.

The present invention comprehends an inverted coupling for disposition between the motor and gearbox pinion and includes a shaft hub mounted on the motor shaft and a gearbox hub mounted on the gearbox shaft. The shaft hub and gearbox hub include annular splines or keyway configurations for accepting keys, corresponding splines or gear teeth. Both hubs are coaxially mounted with respect to the motor shaft and gearbox shaft. A pair of sleeve ring gears are mounted to the shaft hub and the gearbox shaft, and each sleeve ring gear is fixedly mounted to the respective shafts by internal ring gear splines that are radially arranged about the respective sleeve bores. Each sleeve ring gear includes an outer facing portion and a flange portion, and the flange portions extend toward one another when the sleeve ring gears are mounted on the shafts. The flange portions further define an interior annular sleeve surface, and mounted to each annular sleeve surface are a plurality of radially arranged ring gear teeth.

A pair of coupling members are interposed between the sleeve ring gears and partially overlap the shaft and gear box hubs and are themselves partially overlapped or encompassed by the flange portions of each sleeve ring gear. Each coupling member includes a plurality of inner male coupling teeth and a plurality of annular outer coupling teeth with the outer coupling teeth being disposed in intermeshing engagement with the ring gear teeth. Mounted circumjacent to the coupling members, and in driving engagement therewith, is a pair of center flanges. The center flanges are secured together in contiguous relationship and are connected to the inner male coupling teeth of the coupling members by internal radially arranged flange splines. Each center flange defines a center flange bore that is coaxial with the motor shaft and gearbox shaft. A pair of center plates are disposed within the center flange bores and are mounted to the coupling members for maintaining the alignment and positioning of the coupling members and relieving torsional stresses and loads that the elements of the inverted coupling may experience during the transmission of power between the motor shaft and the gear box shaft. Mounted to the interior annular sleeve surface of each sleeve ring gear, and outboard of the ring gear teeth, is a coupling member sleeve seal. The coupling member sleeve seals inwardly project toward the shafts in order to abut the respective coupling members thus forming an annular lubricant channel for holding and retaining therein lubricant.

It is an objective of the present invention to provide an inverted coupling having sleeve ring gears that are attachable to the driving and driven shafts by hubs in a configuration that avoids any interference with the shrouds, shields or enclosures for the motor and gearbox unit.

It is another objective of the present invention to provide an inverted coupling utilizing contact seals that position the sealing area for the lubricant in proximity to the centerline of the center flanges whose orientation is perpendicular to the axes of the driving and driven shafts.

It is still another objective of the present invention to provide an inverted coupling that allows for the replacement of the gear teeth elements of both the coupling members and the sleeve ring gears without causing damage to the shaft and gear box hubs and the center flanges.

It is yet another objective of the present invention to provide an inverted coupling wherein the expansion of the shaft and gear box hubs during assembly and operation causes the sleeve ring gears to be permanently fixed thereon so that rotatable motion of the sleeve ring gears independent of the hubs is prevented.

Yet another objective of the present invention is to provide an inverted coupling that allows changing of the coupling member sleeve seals or contact seals by removing the center flanges but without necessitating the removal of the sleeve ring gears.

Still another objective of the present invention is to provide an inverted coupling wherein the pitch diameter of the ring gear teeth and the outer coupling teeth are maximized to reduce the working stresses on the teeth and to provide for a larger lubricant channel.

Yet still another objective of the present invention is to provide an inverted coupling wherein the rotating mass mounted to the shaft hub and gear box hub is maximized while secondarily supported mass is minimized thereby resulting in enhanced balancing and loading of the elements of the inverted coupling.

Other and more specific advantages and objectives will become apparent from the specification that follows and from the drawings in which like numbers are used throughout to identify like parts.

BRIEF DESCRIPTION OF THE SEVERAL VIEWS OF THE DRAWING(S)

FIG. 4 is sectioned elevational view of an alternative embodiment for the inverted coupling of FIGS. 1 through 3.

DETAILED DESCRIPTION OF THE INVENTION

Figure 1:
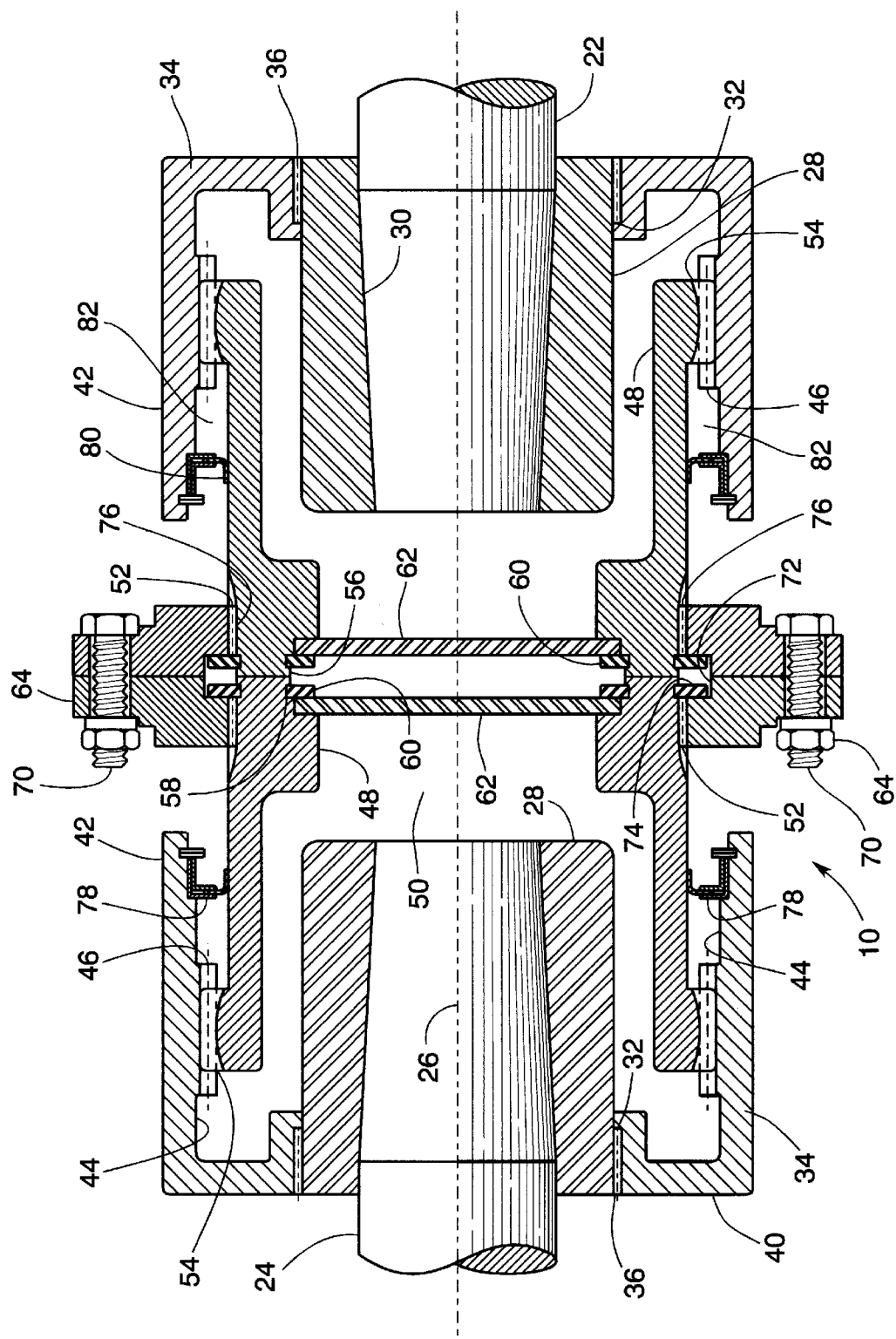
FIG. 1 is a sectioned elevational view of the inverted coupling of the present invention.
Figure 3:
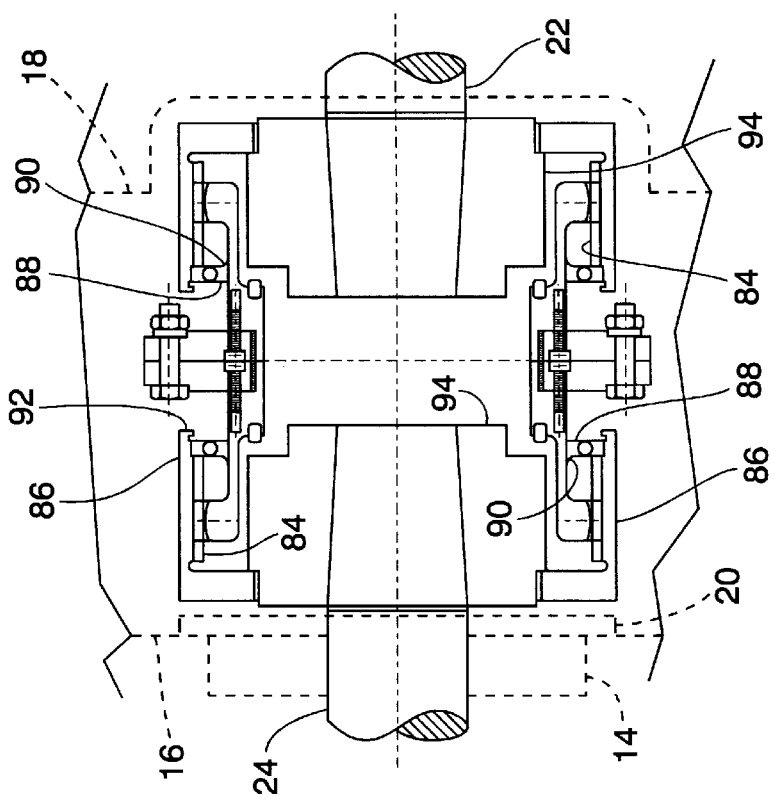
FIG. 3 is a side elevational view of the inverted coupling illustrating its relationship to adjacent machine components.

Illustrated in FIGS. 1 through 4 is inverted coupling 10 for transmitting power (torque) between a prime mover, such as electric motor 12, in the preferred embodiment, of a mass transit vehicle and driven machinery, such as gear box pinion 14 that is one component of gearbox reduction unit 16. Protecting and at least partially enclosing motor 12 is motor shroud 18, and providing protection and some separation of inverted coupling 10 from gearbox unit 16 is gearbox seal plate 20.

Projecting from motor 12 and external to motor shroud 18 is motor shaft 22 and projecting from gearbox pinion 14 and external to gearbox seal plate 20 is gear pinion shaft 24. Motor shaft 22 and gear pinion shaft 24 are disposed in end-to-end confronting—but not contacting—relationship and define a center line or axis of rotation 26; shafts 22 and 24 are coaxially assembled so that motor shaft 22 is the driving shaft and gear pinion shaft 26 is the driven shaft.

Figure 2:
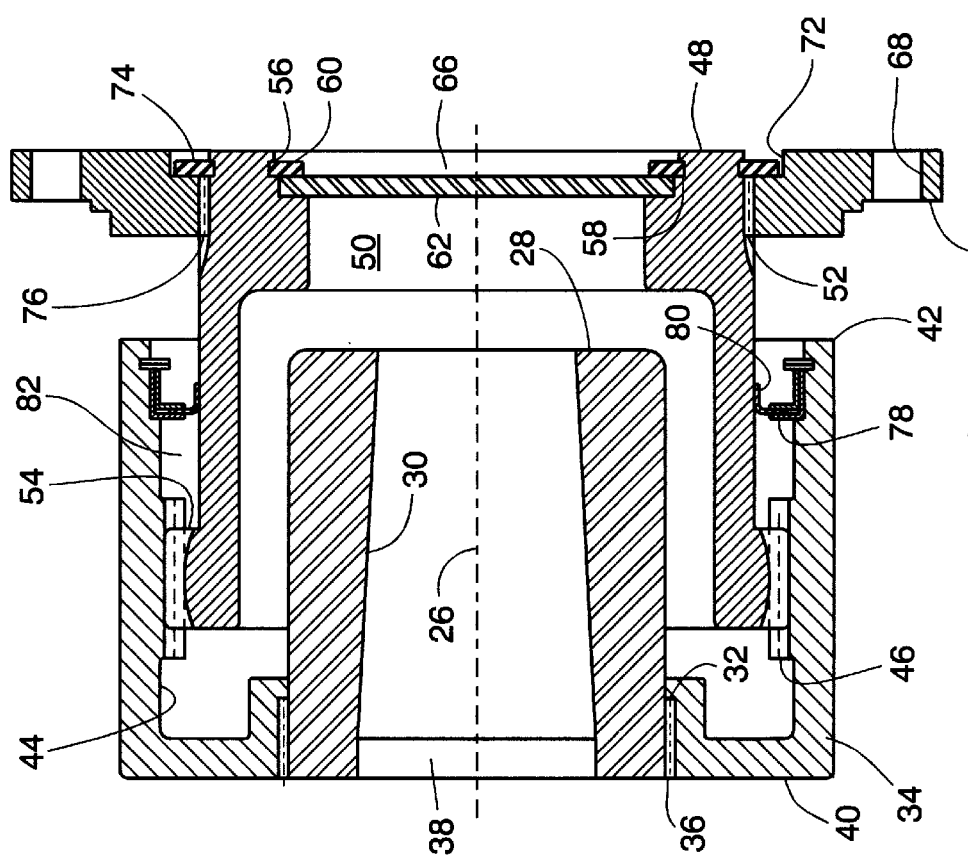
FIG. 2 is a partial sectioned elevational view of the inverted coupling first shown in FIG. 1.

As shown in FIGS. 1 and 2, a pair of generally symmetrical hubs 28 are respectively mounted to the end of motor shaft 22 and the end of gear pinion shaft 24. Each hub 28 has a slightly inwardly tapered hub bore 30 for slidably receiving therein the end of the particular shaft 22 and 24 and hubs 28 are aligned coaxial to the centerline or axis of rotation 26 of both shafts 22 and 24. Hubs 28 can include various kinds of gear fastening means that are annularly disposed on hubs 28 so that gear-type elements can be mounted on hubs 28. Depending on the application and design specifications and requirements, hubs 28 can include annular arranged key seats for receiving keys to fasten the gear-type elements to hubs 28. Annular and externally arranged splines can also be used. Hubs 28 of the present invention employ keys 32 to fasten and fix gear-type elements hereinafter described to hubs 28.

Illustrated in FIGS. 1 and 2 are the gear-type structural components that are fixed to the respective hubs 28 for rotation therewith in order to transmit torque between the driving and driven shafts 22 and 24. Specifically, inverted coupling 10 includes a pair of generally symmetrical and cylindrical sleeve ring gears 34 with each sleeve ring gear 34 adapted for mounting on each respective hub 28 by annular ring gear splines 36 that are radially arranged about sleeve ring gear bore 38. Ring gear splines 36 will then engage either the splines or keys 32 of hubs 28. Each sleeve ring gear 34 includes an outer facing portion 40 that is positioned adjacent to, but not in contact with, motor shroud 18 and the gearbox seal plate 20 when sleeve ring gears 34 are mounted to hubs 28. Sleeve ring gears 34 also include cylindrical flange portion 42 integrally formed to outer facing portion 40. When sleeve ring gears 34 are mounted to the respective shafts 22 and 24, flange portions 42 extend toward one another. Furthermore, each flange portion 42 defines an interior annular sleeve surface 44, and sleeve surfaces 44 are circumjacent to hubs 28 when sleeve gears 34 are mounted thereon. Thus, by mounting sleeve ring gears 34 directly on hubs 28, and, perforce, to the respective shafts 22 and 24, sleeve ring gears 34 become fixed to shafts 22 and 24, and also their relative positions with regard to motor shroud 18 and gearbox pinion 14 and seal plate 20 are fixed so that contact with these machinery components is avoided.

Illustrated in FIGS. 1, 2 and 4 are structural components that facilitate the transmission of torque between motor shaft 22 and gear pinion shaft 24. Mounted to inner annular surface 44 of each sleeve ring gear 34 are radially arranged ring gear teeth 46. Ring gear teeth 46 extend longitudinally along each inner annular surface 44 and are generally parallel to the axis of rotation 26 of the motor and gear pinion shaft 22 and 24 when sleeve ring gears 34 are mounted to hubs 28.

Each sleeve ring gear 34 is positioned on hub 28 for intermeshing engagement with a coupling member 48 as shown in FIGS. 1, 2 and 4. Coupling members 48 are also generally symmetrical and cylindrical components, and are disposed in end-to-end relationship whereupon each coupling member 48 extends partially into the annular space formed between hub 28 and interior annular surface 44 of each sleeve ring gear 34. Each coupling member 48 has a coupling bore 50, and coupling bores 50 are coaxial with sleeve bores 38 and the axis of rotation 26 of both motor shaft 22 and gear pinion shaft 24. Each coupling member 48 includes inner or medial male coupling teeth 52 annularly disposed about the exterior surface of coupling members 48, and a plurality of annularly arranged outer male coupling teeth 54. Outer male coupling teeth 54 are brought into intermeshing engagement with internal ring gear teeth 46, but the longitudinal extension of outer male coupling teeth 54 is less than the longitudinal extension of internal ring gear teeth 46.

As illustrated in FIGS. 1, 2 and 4, formed circumjacent to each coupling bore 50 is an interior annular shoulder or groove 56, and when coupling members 48 are disposed in their operative position, interior annular shoulders 56 are disposed adjacent to one another. Annular slots 58 may also be formed inboard of interior annular shoulders 56 for receiving and holding therein center plate retainer ring 60. In order to facilitate the alignment and positioning of coupling members 48, and to alleviate torsional stresses during machinery operation, a pair of disc-shaped center plates 62 are set within the respective interior annular shoulders 56 of coupling members 48. Center plates 62 are further maintained in their seating within interior annular shoulders 56 by the abutting center plate retainer ring 60.

In order to drivingly connect sleeve ring gear 34 coupling member 48 pair mounted on motor shaft 22 to sleeve ring gear 34 coupling member 48 pair mounted on gearbox shaft 24, a pair of generally cylindrical and symmetrical center flanges 64 are used as shown in FIGS. 1, 2 and 4. Each center flange 64 includes a center flange bore 66 that is coaxial with the axis of rotation 26 of the shafts 22 and 24 and with sleeve bores 38 and coupling bores 50. Disposed about the periphery of each center flange 64 is a plurality of center flange bolt holes 68 and bolt holes 68 of both flanges 64 are aligned so that flange bolts 70 can be inserted therethrough for securing center flanges 64 together in contiguous and confronting relationship. Each center flange 64 also includes an inner annular retainer ring shoulder or seat 72, and when center flanges 64 are bolted together retainer ring seats 72 face each other for receiving and maintaining therein a flange retainer ring 74. Flange retainer rings 74 maintain the relative position of center flanges 64 on coupling members 48 as hereinafter further described. When center flanges 64 are assembled together they define a centerline that is perpendicular to the axis of rotation 26 of motor shaft 22 and gearbox shaft 24.

As illustrated in FIGS. 1, 2 and 4, center flanges 64 are drivingly and rotatably attached to the coupling members 48 by an intermeshing engagement wherein each center flange 64 includes inner annular splines 76 that contact inner male coupling teeth 52 for making the driving engagement between center flanges 64 and the respective coupling members 48.

Because of the various applications and speeds inverted coupling 10 may operate in and at, it is preferable to provide lubricant for outer male coupling teeth 54 and internal ring gear teeth 46 that are in continuous meshing contact. Thus, mounted to each inner annular sleeve surface 44 is seal retaining bracket, retainer or holding member 78 that is positioned outboard of and adjacent to ring gear teeth 46 and outer male coupling teeth 54. Secured to each seal retaining bracket 78 is coupling member sleeve seal or contact seal 80, i.e., a rising ring type of seal, that projects inwardly toward the axis of rotation 26 of both shafts 22 and 24 for abutting the exterior surface of each respective coupling member 48. A sealed channel or chamber 82 is thus formed between each contact seal 80 and each set of internal ring gear teeth 46 and outer coupling teeth 54 for holding or retaining therein lubricant. Due to the larger pitch diameter of the various interengaging elements of inverted coupling 10, lubricant channels 82 are enlarged and thus the quantity of lubricant in each lubricant channel 82 can be increased above standard amounts. In addition to providing for an increased volume of lubricant, the design of inverted coupling 10 of the present invention reduces unbalanced coupling reaction forces because the fixed rotating elements (each hub 28 and sleeve ring gear 34 pair) comprise a larger proportion of the total weight of inverted coupling 10. Moreover, displacement or motion (generally axial) of either motor shaft 22 or gear pinion shaft 24 will cause the concurrent motion of each hub 38 and sleeve ring gear 34 pair because sleeve ring gears 34 are fixed in position to shafts 22 and 24 by respective hubs 28. As a consequence of such motion, internal ring gear teeth 46 will move with a generally longitudinal or axial motion relative to outer coupling teeth 54 of coupling members 48 while staying in meshing engagement therewith.

FIG. 4 discloses a slight variation of the preferred embodiment of the inverted coupling wherein ring gear teeth 84 have a greater longitudinal extension along the inner annular sleeve surface of modified coupling members 86 to abut or terminate at seal retaining bracket 88 and contact seal 90 disposed adjacent the periphery of flange portion 92 of coupling members 86. The shape of hubs 94 has also been slightly modified to accommodate either seals or some type of bump stop.

While the preferred embodiment of the invention has been shown and described, it should be expressly understood that modifications and changes may be made without departing from the scope of the invention as defined in the appended claims.

The embodiments of the invention in which an exclusive property or privilege is claimed are defined as follows:

1. An inverted coupling for transmitting torque between the generally axially aligned ends of a motor shaft and a gear pinion shaft projecting toward each other from, respectively, a gear box and a motor, the inverted coupling comprising:

a pair of center flanges secured to each other and disposed between the respective ends of the motor shaft and the gearbox pinion shaft, each center flange having a center flange bore defined by an annular inner bore surface and a plurality of radially disposed center flange splines projecting inwardly from the annular inner bore surface;

a pair of generally cylindrical coupling members with each coupling member mounted to each respective center flange so that the coupling members and center flanges are in axial alignment and each coupling member includes a plurality of radially arranged inner coupling teeth for interengagement with the respective center flange splines, and a plurality of radially disposed outer coupling teeth;

a pair of sleeve ring gears with each sleeve ring gear drivingly mounted to each respective coupling member and each sleeve ring gear having an outer facing portion, an inwardly extending flange that defines an interior annular sleeve surface and a plurality of internal ring gear teeth mounted on the interior annular sleeve surface for achieving a driving interconnection with the outer coupling teeth of each respective coupling member; and, each sleeve ring gear being fixedly mounted to, respectively, the end of the motor shaft and the end of the gear pinion shaft whereupon axial displacement of the motor shaft and gear pinion shaft results in the concomitant axial displacement of the sleeve ring gears and the longitudinal movement of the internal ring gears teeth along and in intermeshing engagement with the respective outer coupling teeth of the coupling members.

2. The inverted coupling of claim 1 wherein each center flange includes an interior annular retainer seat that is circumjacent the center flange bore and the interior annular retainer seats face each other when the center flanges are secured together.

3. The inverted coupling of claim 2 further comprising at least two annular flange retainer rings with each annular flange retainer ring disposed in the interior retainer seat of each respective center flange and partially contacting each respective coupling member for maintaining the alignment and positioning of the center flanges and the coupling members.

4. The inverted coupling of claim 3 wherein each coupling member includes an inner annular shoulder circumjacent the center flange bores and oppositely disposed to each other when the coupling members are secured to the center flanges.

5. The inverted coupling of claim 4 further comprising a pair of generally cylindrical center plates with each center plate capable of being seated within the inner annular shoulder of each respective coupling member for maintaining the relative axial disposition of the coupling members with respect to the motor shaft and gear pinion shaft.

6. The inverted coupling of claim 5 wherein each sleeve ring gear includes a seal retaining member mounted on the interior sleeve surface of each sleeve ring gear.

7. The inverted coupling of claim 6 further comprising a pair of coupling member sleeve seals with each coupling member sleeve seal mounted to each seal retaining member so that each coupling member sleeve seal is able to abut the respective coupling member and thus form an annular lubricant channel therebetween for containing lubricant therein.

8. An inverted coupling for transferring power between the motor shaft of an electric motor and the gear pinion shaft of a gearbox wherein the motor shaft has a shaft hub mounted thereon and the gear pinion shaft has a gear hub mounted thereon and both shafts are in confronting axial alignment, the inverted coupling comprising:

a pair of sleeve gears with one sleeve gear mounted on the shaft hub and the other sleeve gear mounted on the gear hub, each sleeve gear having an outer facing portion, a flange portion that extends inwardly toward the flange portion of the oppositely mounted sleeve gear, each flange portion defining an interior annular sleeve surface, and a plurality of ring gear teeth mounted to the interior sleeve surface;

a pair of coupling members disposed circumjacent the motor shaft and the gear pinion shaft and within the flange portions of the sleeve gears coaxial thereto, each coupling member having annularly arranged outer coupling teeth that intermesh with the respective ring gear teeth, annular inner coupling teeth, and a coupling bore into which the end of the motor shaft and the end of the gear pinion shaft respectively protrude; and, a pair of symmetrical center flanges removably securable to each other in confronting relationship for mounting to the coupling members and between the sleeve gears so that power can be transmitted from the sleeve gear and coupling member drivingly mounted to the motor shaft through the center flanges and to the sleeve gear and coupling member drivingly mounted to the gear pinion shaft.

9. The inverted coupling of claim 8 further comprising at least one pair of annular seal retaining members with each seal retaining member mounted on the interior annular sleeve surface of each sleeve gear and outboard of the ring gear teeth.

10. The inverted coupling of claim 9 further comprising a pair of coupling member sleeve seals with each coupling member sleeve seal mounted to each seal retaining member and partially projecting therefrom in order to abut each coupling member outboard of the respective ring gear teeth and outer coupling teeth thereby forming an annular lubricant channel for containing lubricant therein.

11. The inverted coupling of claim 10 wherein each center flange includes a center flange bore that is disposed in general axial alignment with the motor shaft and the gear pinion shaft when the center flanges are secured to the coupling members.

12. The inverted coupling of claim 11 wherein each center flange includes an interior annular retainer seat circumjacent the center flange bore whereupon the interior annular retainer seats face each other when the center flanges are secured together for mounting to the coupling members.

13. The inverted coupling of claim 12 further comprising a pair of annular flange retainer rings with each flange retainer ring set within each interior annular retainer seat for maintaining the relative positioning of the center flanges to the coupling members.

14. The inverted coupling of claim 13 wherein each coupling member includes an interior annular shoulder and the interior annular shoulders oppose each other when the coupling members are disposed in their operative position.

15. The inverted coupling of claim 14 further comprising a pair of disc-shaped center plates with each center plate set within the interior annular shoulder of the respective coupling member for maintaining the relative axial positioning and intermeshing engagement of the coupling members and the sleeve gears.

16. The inverted coupling of claim 15 wherein the ring gear teeth of the sleeve gears are capable of longitudinal movement relative to the outer coupling teeth of the coupling members concomitant with the axial motion of the motor shaft and the gear pinion shaft.

17. An inverted coupling for disposition between an electric motor and a gear box pinion for transmitting power between the motor shaft of the electric motor and the gear pinion shaft of the gear box pinion, the inverted coupling comprising:

a pair of sleeve ring gears oppositely mounted to each other on the motor shaft and the gear pinion shaft for rotation therewith, each sleeve ring gear including an outer facing portion, an inwardly projecting flange portion with the flange portions extending toward each other, an interior annular surface, and one set of internal ring gear teeth secured to the interior annular sleeve surface;

a pair of coupling members with each coupling member having a coupling bore that is disposed in general axial alignment with the motor shaft and the gear pinion shaft, a plurality of annularly arranged medial coupling teeth, a plurality of outer annular male coupling teeth such that each coupling member partially under laps the respective flange portion of each sleeve ring gear so that the outer male coupling teeth are brought into intermeshing engagement with the internal ring gear teeth thereby allowing concurrent rotation of each pair of sleeve ring gears and coupling members;

a pair of center flanges for contiguous disposition to each other and drivingly engaged to each respective coupling member adjacent the medial coupling teeth in order to transmit power between the sleeve ring gear and coupling member drivingly mounted on the motor shaft and the sleeve ring gear and coupling member drivingly mounted on the gear pinion shaft; and, at least one pair of annular sleeve ring gear seals with each sleeve ring gear seal mounted to the interior annular surface of each sleeve ring gear and abutting the respective coupling member thus forming an annular lubricant channel between each sleeve ring gear seal and each pair of intermeshing internal ring gear teeth and outer male coupling teeth.

18. The inverted coupling of claim 17 further comprising a pair of center plates with each center plate mounted within each respective coupling bore for maintaining the positioning of the coupling members relative to each other and the sleeve ring gears.

19. The inverted coupling of claim 18 wherein the working surface of the internal ring gear teeth is greater than the working surface of the corresponding and intermeshing outer male coupling teeth so that each pair of internal ring gear teeth and outer male coupling teeth remain in intermeshing engagement during axial motion of the sleeve ring gears concomitant with the axial motion of the motor shaft and the gear pinion shaft.

* * * * *